United States Patent
Gross et al.

(10) Patent No.: US 10,685,226 B1
(45) Date of Patent: *Jun. 16, 2020

(54) DETECTING COUNTERFEIT COMPONENTS IN UTILITY SYSTEM ELECTRONICS BASED ON EMI FINGERPRINTS

(71) Applicant: Oracle International Corporation, Redwood Shores, CA (US)

(72) Inventors: Kenny C. Gross, Escondido, CA (US); Andrew J. Lewis, Litchfield, NH (US); Edward R. Wetherbee, Omaha, NE (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,623

(22) Filed: Mar. 5, 2019

(51) Int. Cl.
    *G06K 9/00* (2006.01)
(52) U.S. Cl.
    CPC ................ *G06K 9/00536* (2013.01)
(58) Field of Classification Search
    CPC ... G01R 31/002; G01R 31/2813; G06F 21/73; G06K 9/6271; G06K 9/00536
    USPC ........................................................ 340/653
    See application file for complete search history.

(56) References Cited

U.S. PATENT DOCUMENTS

| | | | | |
|---|---|---|---|---|
| 5,218,294 A | * | 6/1993 | Soiferman | G01R 31/309 324/763.01 |
| 7,250,757 B1 | * | 7/2007 | Tiernan | G01N 27/9046 324/228 |
| 7,613,580 B2 | * | 11/2009 | Gross | G01R 31/002 324/628 |
| 8,069,490 B2 | * | 11/2011 | Gross | G06K 9/6271 726/34 |
| 9,851,386 B2 | * | 12/2017 | Keller, III | G06F 21/73 |
| 9,893,898 B2 | * | 2/2018 | Kreft | G06F 21/71 |
| 10,395,032 B2 | * | 8/2019 | Keller | G06F 21/566 |
| 2004/0075453 A1 | * | 4/2004 | Slupsky | G01R 31/3025 324/754.23 |
| 2015/0358337 A1 | * | 12/2015 | Keller | G06F 11/00 726/23 |
| 2019/0128937 A1 | * | 5/2019 | Choi | G01R 29/0814 |

* cited by examiner

*Primary Examiner* — Eric Blount
(74) *Attorney, Agent, or Firm* — Park, Vaughan, Fleming & Dowler LLP

(57) ABSTRACT

The disclosed embodiments provide a system that detects counterfeit electronic components in a target device, which is part of an electrical generation and distribution system. During operation, the system obtains target EMI signals, which were gathered by monitoring target electromagnetic interference (EMI) emissions generated by the target device using one or more target antennas positioned in proximity to the target device. Next, the system generates a target EMI fingerprint for the target device from the target EMI signals. Finally, the system compares the target EMI fingerprint against a reference EMI fingerprint for the target device to determine whether the target device contains one or more counterfeit electronic components.

18 Claims, 4 Drawing Sheets

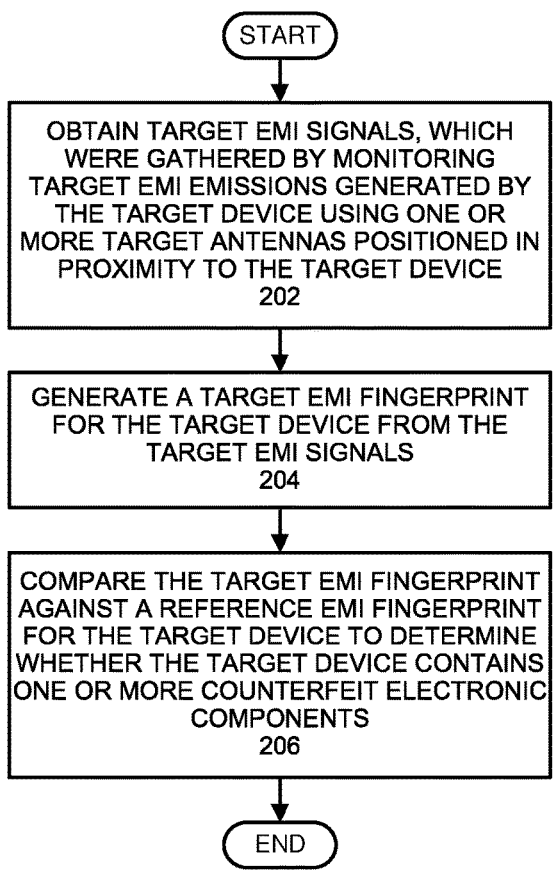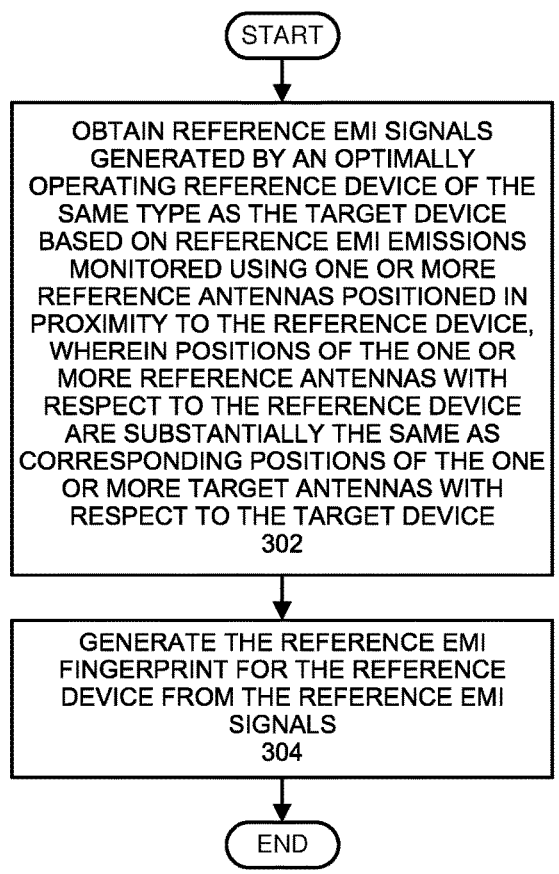
FIG. 2
FIG. 3

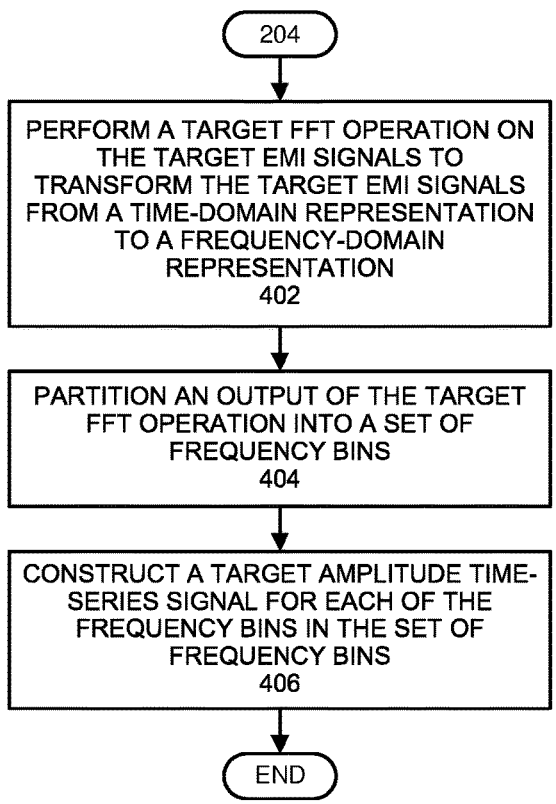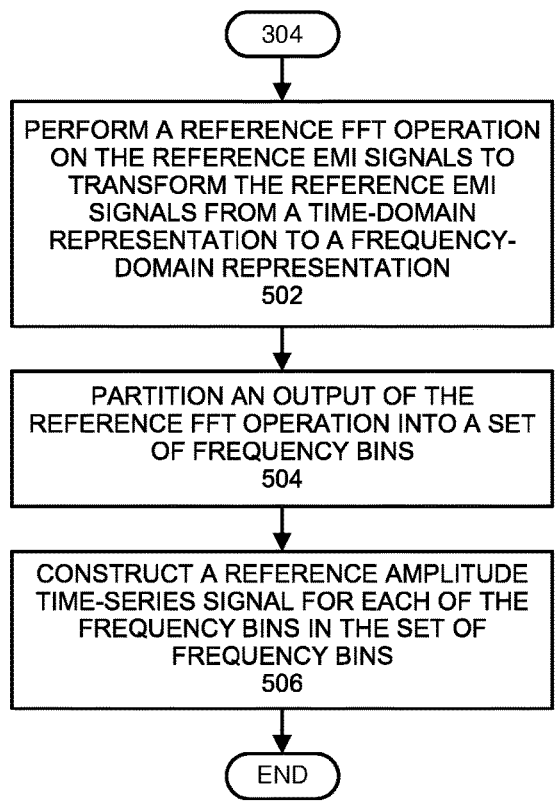
FIG. 4
FIG. 5

DETECTING COUNTERFEIT COMPONENTS IN UTILITY SYSTEM ELECTRONICS BASED ON EMI FINGERPRINTS

BACKGROUND

Field

The disclosed embodiments generally relate to techniques for detecting counterfeit electrical components in utility system assets. More specifically, the disclosed embodiments relate to a technique that detects counterfeit electrical components in utility system assets by analyzing EMI emissions generated by the assets.

Related Art

Counterfeiting of electronic components is a significant problem in many industries. These counterfeit components often comprise scrap components from discarded systems, cheaply manufactured components, or older components, which have been repackaged. This creates problems because counterfeit components often perform poorly, or fail within a short period of time. Moreover, in military, medical, and aviation electronics, counterfeit components can cause injury or loss of life.

Counterfeiters often use packaging, labeling, and part numbers that closely match the authentic components to deceive purchasers. In fact, counterfeit parts often appear so real that service engineers cannot distinguish them from authentic components through visual inspection. These counterfeit components then make their way into the supply chain through various brokerage channels.

One technique for preventing the use of counterfeit components is to place labels that are hard to duplicate, such as holographic labels, on authentic components. However, the process of verifying these labels typically requires a system containing the components to be disassembled. Moreover, such intrusive counterfeit-detection techniques have limited effectiveness because there have been many reported cases across multiple industries where counterfeiters are also counterfeiting the holographic labels. Finally, these measures are extremely labor-intensive, which makes them impractical for many use cases.

Counterfeit components are especially problematic in the utility industry, because a failure of a counterfeit component in a utility system asset can lead to a power failure that can adversely affect large numbers of customers. For this reason, the Utilities Telecom Council recently published a report specifically directed to electric utilities, entitled "Cyber Supply Chain Risk Management for Utilities—Roadmap for Implementation." This report provides guidance for electric utilities to help them handle suppliers and minimize risks arising from counterfeit components. After this report was published, the North American Electric Reliability Corporation (NERC), and the U.S. Federal Energy Reliability Commission (FERC) issued a new standard for managing supply chain risk, with which all North American electric utilities must comply by April 2020. This new standard is problematic, because electric utilities are presently unable to detect counterfeit components in their supply chains (as is required by the new standard) in a practical manner. Electric utilities have so far only considered infeasible techniques for counterfeit detection, such as opening up transformers and examining internal components using a magnifying glass.

Hence, what is needed is a technique for detecting counterfeit electrical components in utility system assets without the drawbacks of existing counterfeit-detection techniques.

SUMMARY

The disclosed embodiments provide a system that detects counterfeit electronic components in a target device, which is part of an electrical generation and distribution system. During operation, the system obtains target EMI signals, which were gathered by monitoring target electromagnetic interference (EMI) emissions generated by the target device using one or more target antennas positioned in proximity to the target device. Next, the system generates a target EMI fingerprint for the target device from the target EMI signals. Finally, the system compares the target EMI fingerprint against a reference EMI fingerprint for the target device to determine whether the target device contains one or more counterfeit electronic components.

In some embodiments, prior to obtaining the target EMI signals, the system generates the reference EMI fingerprint. During this process, the system obtains reference EMI signals generated by an optimally operating reference device of the same type as the target device. These EMI signals are obtained from reference EMI emissions monitored using one or more reference antennas positioned in proximity to the reference device, wherein positions of the one or more reference antennas with respect to the reference device are substantially the same as corresponding positions of the one or more target antennas with respect to the target device. The system then generates the reference EMI fingerprint for the reference device from the reference EMI signals.

In some embodiments, while generating the reference EMI fingerprint from the reference EMI signals, the system performs a reference Fast Fourier Transform (FFT) operation on the reference EMI signals to transform the reference EMI signals from a time-domain representation to a frequency-domain representation. Next, the system partitions an output of the reference FFT operation into a set of frequency bins, and constructs a reference amplitude time-series signal for each of the frequency bins in the set of frequency bins.

In some embodiments, while generating the target EMI fingerprint from the target EMI signals, the system performs a target FFT operation on the target EMI signals to transform the target EMI signals from a time-domain representation to a frequency-domain representation. Next, the system partitions an output of the target FFT operation into a set of frequency bins, and constructs a target amplitude time-series signal for each of the frequency bins in the set of frequency bins.

In some embodiments, prior to obtaining the target EMI signals, the system trains a multivariate state estimation technique (MSET) model using the reference amplitude time-series signals for the reference EMI fingerprint. In these embodiments, while comparing the target EMI fingerprint against the reference EMI fingerprint, the system uses the trained MSET model, which receives the target amplitude time-series signals as inputs, to produce estimated values for the target amplitude time-series signals. Next, the system performs pairwise differencing operations between actual values and the estimated values for the amplitude time-series signals to produce residuals. The system then performs a sequential probability ratio test (SPRT) on the residuals to produce SPRT alarms. Finally, the system determines from the SPRT alarms whether the target device contains one or more counterfeit electronic components.

In some embodiments, the one or more target antennas comprise a plurality of portable antennas, which are affixed at different locations and orientations with respect to the target device, and which communicate with a data-acquisition unit that gathers the target EMI signals.

In some embodiments, the portable antennas include software-defined radios (SDRs) for scanning the target device through signals obtained from the one or more target antennas, and for interfacing the one or more target antennas with the data-acquisition unit.

In some embodiments, the target device, which is part of the electrical generation and distribution system, comprises one of the following: an electrical transformer; a device, which is part of an electrical generating plant; and a device, which is part of an electrical transmission grid.

BRIEF DESCRIPTION OF THE FIGURES

FIG. 2 presents a flow chart illustrating a process for detecting counterfeit components in a target device, which is part of an electrical generation and distribution system, in accordance with the disclosed embodiments.

FIG. 3 presents a flow chart illustrating a process for generating a reference EMI fingerprint for the target device in accordance with the disclosed embodiments.

FIG. 4 presents a flow chart illustrating a process for generating a target EMI fingerprint from target EMI signals in accordance with the disclosed embodiments.

FIG. 5 presents a flow chart illustrating a process for generating a reference EMI fingerprint from reference EMI signals in accordance with the disclosed embodiments.

DETAILED DESCRIPTION

Figure 1:
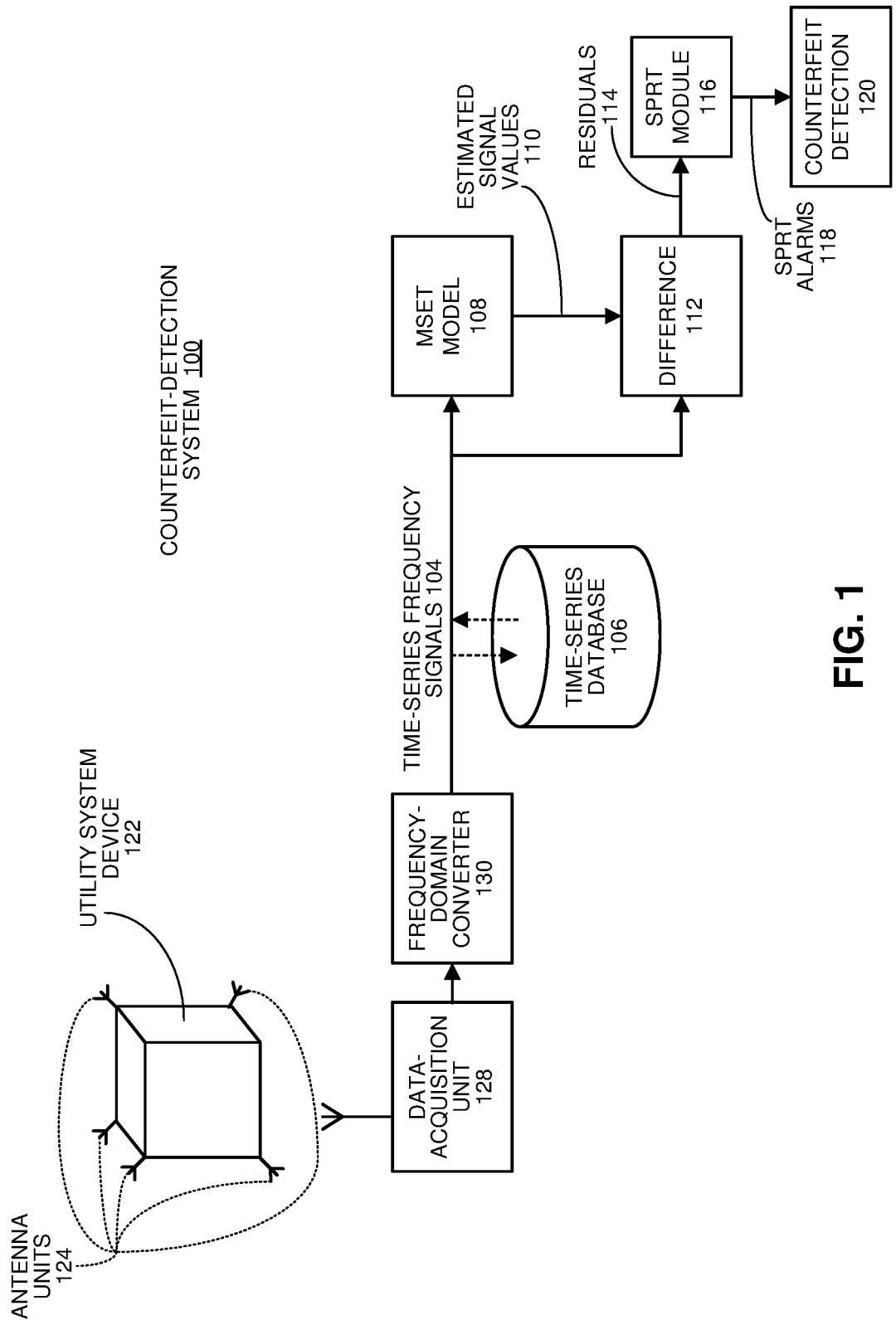
FIG. 1 illustrates an exemplary counterfeit-detection system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide a low-cost and passive technique for detecting counterfeit components in utility system assets. This technique is "passive" because (unlike existing counterfeit-detection techniques) it does not involve disassembling complex power system electronics to perform internal visual or photographic inspections. Note that existing counterfeit-detection techniques are ineffective and often cause subsequent problems in the electronic systems, even if they do not detect any counterfeit components. In contrast, this new technique makes it practical to periodically inspect power system devices in the supply chain, or at ports of entry, or when systems are received by a utility customer as part of initial setup preparation and during power-on-self-test (POST) operations. Hence, this new technique helps to ensure that no counterfeit components or "mod chips" are installed in power system electronics between component manufacturing and the "assembly plant," or in transit between the assembly plant and the utility system. Moreover, this new technique requires no hardware modifications in utility power systems, and is therefore backward-compatible with legacy power systems, which are commonly used by utilities.

Details

This new technique requires training operations on an optimally functioning "golden system." For any make and model of a power system device, a golden system is newly manufactured system, which the vendor has painstakingly certified to have no counterfeit internal components. (Note that although it may require considerable effort to certify that the golden system contains no counterfeit internal components, it is much easier to do so for just one golden system, than for thousands of similar systems in the field.)

This new technique also makes use of a set of antennas, which are coupled to AM/FM radiofrequency demodulators to gather EMI emissions. These antennas are placed at specific locations in and around a device under test. The digitized output from the radiofrequency demodulators is then consumed by a pattern-recognition system that performs "EMI fingerprint" detection operations to detect counterfeit components.

Previous techniques for EMI fingerprint detection made use of a detector, which was integrated with a handheld wand. (See U.S. Pat. No. 8,069,480, entitled "Detecting Counterfeit Electronic Components Using EMI Telemetric Fingerprints" by inventors Kenny C. Gross, et al., filed 16 Oct. 2007.) However, a major challenge in training technicians to use such a handheld detector is to ensure that the orientation of the handheld detector is similar to that used while monitoring the golden system. The new technique mitigates this handheld detector problem by obtaining inputs from multiple antennas affixed at different pre-specified locations and orientations with respect to the target device. This new technique also makes use of inexpensive software-defined radios (SDRs), which are integrated with the antennas in a magnetic-mount unit, and which communicates with a data-acquisition unit.

During operation, this new technique merges measurements taken from multiple antenna units. For example, in systems with rectangular form factors, one antenna unit can be located on top of the system, and antenna units can be placed on each of the four vertical sides. The exact location and orientation of the antenna units can be pre-specified to ensure that the data gathered from a monitored system will closely match the data gathered from the golden system. This new technique is not limited to devices that have a rectangular form factor. In general, the new technique can be applied to a power-system asset having any size or shape, whether the system is ferromagnetic or not. For assets encased in aluminum, wood, or other nonmagnetic materials, it is possible to use common "sensor wax" or some type of adhesive to affix the antenna units.

The EMI fingerprint is characterized by first performing an FFT operation on the signals from the antennas to convert them from the time domain to the frequency domain. Next, our system divides the radio-frequency spectrum (e.g., from ~500 kHz up to 1.5 GHz) into individual bins (e.g., 20 bins). For each bin, the system reports an amplitude-versus-time for the mean frequency of the bin to generate a corresponding time-series signal. Hence, for one antenna unit there will be 20 time-series signals corresponding to the 20 independent frequency bins. However, our system uses multiple antenna units (e.g., 5 antenna units) situated at different locations and orientations with respect to the device being monitored to simultaneously measure EMI spectral components from multiple external surfaces of the device. In the case where five antenna units are simultaneously performing measurements, we now have 5×20 or 100 time-series signals being analyzed by our pattern-recognition technique.

Note that any one antenna unit may be more distant from a counterfeit component, or may have variable attenuation caused by other internal metal components. Hence, it is advantageous to monitor the EMI emissions from a device using multiple antenna units situated at different locations and orientations with respect to the device. This multiplies the viewing angles, thereby improving the probability that our technique will successfully detect internal counterfeit components.

With N antenna units, our new technique trains an MSET model based on N×20 frequency-specific time-series signals to capture a unique frequency-based EMI fingerprint for the device under surveillance. This makes it possible for users having little training to follow a simple procedure to affix antenna units to an asset, and then run a short test (e.g., five minutes) to either positively identify the presence of internal counterfeit components, or to positively certify that the asset contains no internal counterfeit components.

Note that it does not matter that power system assets may be encased in metal containers. Despite the "Faraday cage" effect, empirical measurements indicate that EMI noise can be detected from outside assets contained in metal enclosures. This noise can be subsequently analyzed using MSET-based pattern-recognition techniques to facilitate counterfeit component detection with high prognostic sensitivity with low rates of false positives and false negatives.

Before describing our new technique in further detail, we first describe the structure of an exemplary counterfeit-detection system in which it operates.

Counterfeit-Detection System

FIG. 1 illustrates an exemplary counterfeit-detection system 100 in accordance with the disclosed embodiments. As illustrated in FIG. 1, counterfeit-detection system 100 gathers signals containing EMI emission information from antenna units 124, which are situated at different locations and orientations with respect to a utility system device 122. (Note that utility system device 122 can generally include any type of device that is part of an electrical generation and distribution system, such as a transformer, or some other device, which is part of an electrical generating plant or an electrical transmission grid.) Signals from antenna units 124 are communicated to a data-acquisition unit 128, which gathers the signals and feeds them through a frequency-domain converter 130, which performs FFT operations on the signals, and then divides the output of the FFT operations into different frequency bins to produce time-series frequency signals 104.

During operation of counterfeit-detection system 100, time-series signals 104 can feed into a time-series database 106, which stores the time-series signals 104 for subsequent analysis. Next, time-series signals 104 either feed directly from frequency-domain converter 130 or from time-series database 106 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series frequency signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate SPRT alarms 118. (For a description of the SPRT model, please see Wald, Abraham, June 1945, "Sequential Tests of Statistical Hypotheses." *Annals of Mathematical Statistics*. 16 (2): 117-186.)

SPRT alarms 118 then feed into a counterfeit detection model 120 which detects the presence of counterfeit components inside utility system device 122 based on a tripping frequency for SPRT alarms 118.

Process of Detecting Counterfeit Components

FIG. 2 presents a flow chart illustrating a process for detecting counterfeit components in a target device, which is part of an electrical generation and distribution system, in accordance with the disclosed embodiments. During operation, the system obtains target EMI signals, which were gathered by monitoring target EMI emissions generated by the target device using one or more target antennas positioned in proximity to the target device (step 202). Next, the system generates a target EMI fingerprint for the target device from the target EMI signals (step 204). Finally, the system compares the target EMI fingerprint against a reference EMI fingerprint for the target device to determine whether the target device contains one or more counterfeit electronic components.

FIG. 3 presents a flow chart illustrating a process for generating a reference EMI fingerprint for the target device in accordance with the disclosed embodiments. Prior to obtaining the target EMI signals, the system obtains reference EMI signals generated by an optimally operating reference device of the same type as the target device based on reference EMI emissions monitored using one or more reference antennas positioned in proximity to the reference device, wherein positions of the one or more reference antennas with respect to the reference device are substantially the same as corresponding positions of the one or more target antennas with respect to the target device (step 302). The system then generates the reference EMI fingerprint for the reference device from the reference EMI signals (step 304).

FIG. 4 presents a flow chart illustrating a process for generating a target EMI fingerprint from target EMI signals in accordance with the disclosed embodiments. (This flow chart illustrates in more detail the operations performed in step 204 of the flow chart in FIG. 2.) First, the system performs a target FFT operation on the target EMI signals to transform the target EMI signals from a time-domain representation to a frequency-domain representation (step 402). Next, the system partitions an output of the target FFT operation into a set of frequency bins (step 404). Finally, the system constructs a target amplitude time-series signal for each of the frequency bins in the set of frequency bins (step 406).

FIG. 5 presents a flow chart illustrating a process for generating a reference EMI fingerprint from reference EMI signals in accordance with the disclosed embodiments. (This flow chart illustrates in more detail the operations performed in step 304 of the flow chart in FIG. 3.) First, the system performs a reference FFT operation on the reference EMI signals to transform the reference EMI signals from a time-domain representation to a frequency-domain representation (step 502). Next, the system partitions an output of the reference FFT operation into a set of frequency bins (step 504). Finally, the system constructs a reference amplitude time-series signal for each of the frequency bins in the set of frequency bins (step 506).

Figure 6:
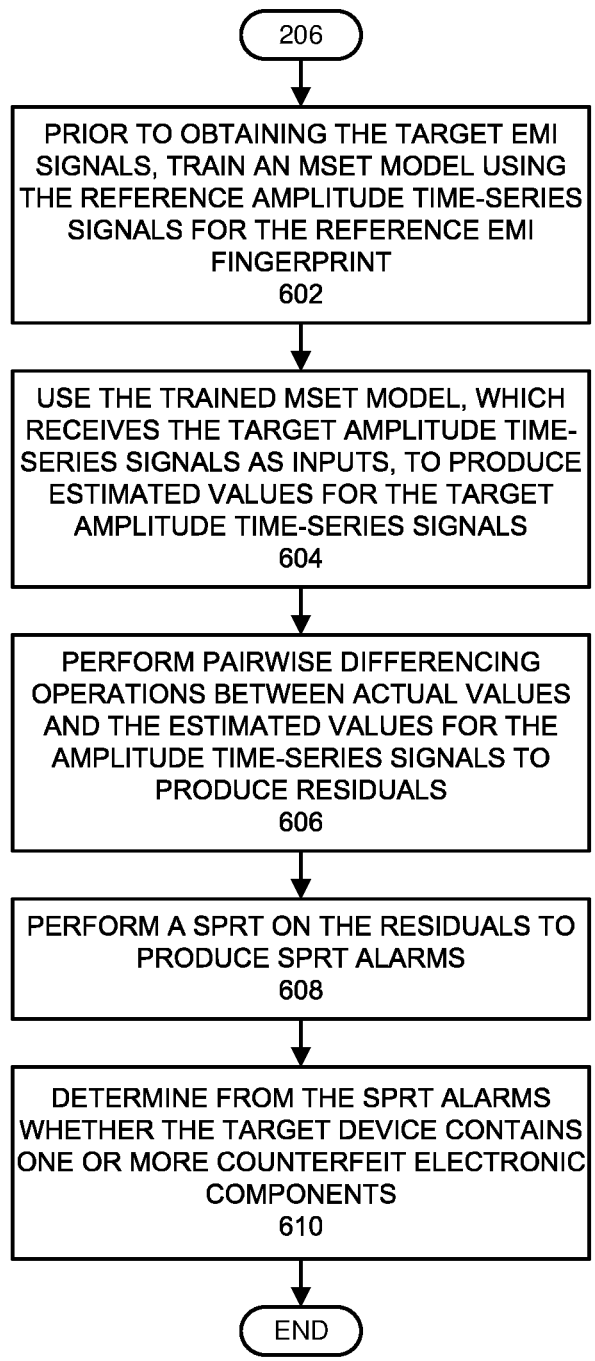
FIG. 6 presents a flow chart illustrating a process for comparing a target EMI fingerprint with a reference EMI fingerprint in accordance with the disclosed embodiments.

FIG. 6 presents a flow chart illustrating a process for comparing a target EMI fingerprint with a reference EMI fingerprint in accordance with the disclosed embodiments. (This flow chart illustrates in more detail the operations performed in step 206 of the flow chart in FIG. 2.) Prior to obtaining the target EMI signals, the system trains an MSET model using the reference amplitude time-series signals for the reference EMI fingerprint (step 602). Next, the system uses the trained MSET model, which receives the target amplitude time-series signals as inputs, to produce estimated values for the target amplitude time-series signals (step 604). The system then performs pairwise differencing operations between actual values and the estimated values for the amplitude time-series signals to produce residuals (step 606). Next, the system performs a sequential SPRT on the residuals to produce SPRT alarms (step 608). Finally, the system determines from the SPRT alarms whether the target device contains one or more counterfeit electronic components (step 610).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for detecting counterfeit electronic components in a target device, which is part of an electrical generation and distribution system, the method comprising:
   obtaining target EMI signals, which were gathered by monitoring target electromagnetic interference (EMI) emissions generated by the target device using one or more target antennas positioned in proximity to the target device;
   generating a target EMI fingerprint for the target device from the target EMI signals; and
   comparing the target EMI fingerprint against a reference EMI fingerprint for the target device to determine whether the target device contains one or more counterfeit electronic components;
   wherein the target device, which is part of the electrical generation and distribution system, comprises one of the following:
   an electrical transformer;
   a device, which is part of an electrical generating plant; and
   a device, which is part of an electrical transmission grid.

2. The method of claim 1, wherein prior to obtaining the target EMI signals, the method further comprises generating the reference EMI fingerprint by:
   obtaining reference EMI signals generated by an optimally operating reference device of the same type as the target device based on reference EMI emissions monitored using one or more reference antennas positioned in proximity to the reference device;
   wherein positions of the one or more reference antennas with respect to the reference device are substantially the same as corresponding positions of the one or more target antennas with respect to the target device; and
   generating the reference EMI fingerprint for the reference device from the reference EMI signals.

3. The method of claim 2, wherein generating the reference EMI fingerprint from the reference EMI signals involves:
   performing a reference Fast Fourier Transform (FFT) operation on the reference EMI signals to transform the reference EMI signals from a time-domain representation to a frequency-domain representation;
   partitioning an output of the reference FFT operation into a set of frequency bins; and
   constructing a reference amplitude time-series signal for each of the frequency bins in the set of frequency bins.

4. The method of claim 3, wherein generating the target EMI fingerprint from the target EMI signals involves:
   performing a target FFT operation on the target EMI signals to transform the target EMI signals from a time-domain representation to a frequency-domain representation;
   partitioning an output of the target FFT operation into a set of frequency bins; and constructing a target amplitude time-series signal for each of the frequency bins in the set of frequency bins.

5. The method of claim 4, wherein comparing the target EMI fingerprint against the reference EMI fingerprint involves:
   prior to obtaining the target EMI signals, training a multivariate state estimation technique (MSET) model using the reference amplitude time-series signals for the reference EMI fingerprint;
   using the trained MSET model, which receives the target amplitude time-series signals as inputs, to produce estimated values for the target amplitude time-series signals;
   performing pairwise differencing operations between actual values and the estimated values for the amplitude time-series signals to produce residuals;
   performing a sequential probability ratio test (SPRT) on the residuals to produce SPRT alarms; and
   determining from the SPRT alarms whether the target device contains one or more counterfeit electronic components.

6. The method of claim 1, wherein the one or more target antennas comprise a plurality of portable antennas, which are affixed at different locations and orientations with respect to the target device, and which communicate with a data-acquisition unit that gathers the target EMI signals.

7. The method of claim 1, wherein the portable antennas include software-defined radios (SDRs) for communicating with the data-acquisition unit.

8. A non-transitory, computer-readable storage medium storing instructions that when executed by a computer cause the computer to perform a method for detecting counterfeit electronic components in a target device, which is part of an electrical generation and distribution system, the method comprising:
   obtaining target EMI signals, which were gathered by monitoring target electromagnetic interference (EMI) emissions generated by the target device using one or more target antennas positioned in proximity to the target device;
   generating a target EMI fingerprint for the target device from the target EMI signals; and
   comparing the target EMI fingerprint against a reference EMI fingerprint for the target device to determine whether the target device contains one or more counterfeit electronic components;
   wherein the one or more target antennas comprise a plurality of portable antennas, which are affixed at different locations and orientations with respect to the target device, and which communicate with a data-acquisition unit that gathers the target EMI signals.

9. The non-transitory, computer-readable storage medium of claim 8, wherein prior to obtaining the target EMI signals, the method further comprises generating the reference EMI fingerprint by:
   obtaining reference EMI signals generated by an optimally operating reference device of the same type as the target device based on reference EMI emissions monitored using one or more reference antennas positioned in proximity to the reference device;
   wherein positions of the one or more reference antennas with respect to the reference device are substantially the same as corresponding positions of the one or more target antennas with respect to the target device; and
   generating the reference EMI fingerprint for the reference device from the reference EMI signals.

10. The non-transitory, computer-readable storage medium of claim 9, wherein generating the reference EMI fingerprint from the reference EMI signals involves:
    performing a reference Fast Fourier Transform (FFT) operation on the reference EMI signals to transform the reference EMI signals from a time-domain representation to a frequency-domain representation;
    partitioning an output of the reference FFT operation into a set of frequency bins; and
    constructing a reference amplitude time-series signal for each of the frequency bins in the set of frequency bins.

11. The non-transitory, computer-readable storage medium of claim 10, wherein generating the target EMI fingerprint from the target EMI signals involves:
    performing a target FFT operation on the target EMI signals to transform the target EMI signals from a time-domain representation to a frequency-domain representation;
    partitioning an output of the target FFT operation into a set of frequency bins; and
    constructing a target amplitude time-series signal for each of the frequency bins in the set of frequency bins.

12. The non-transitory, computer-readable storage medium of claim 11, wherein comparing the target EMI fingerprint against the reference EMI fingerprint involves:
    prior to obtaining the target EMI signals, training a multivariate state estimation technique (MSET) model using the reference amplitude time-series signals for the reference EMI fingerprint;
    using the trained MSET model, which receives the target amplitude time-series signals as inputs, to produce estimated values for the target amplitude time-series signals;
    performing pairwise differencing operations between actual values and the estimated values for the amplitude time-series signals to produce residuals;
    performing a sequential probability ratio test (SPRT) on the residuals to produce SPRT alarms; and
    determining from the SPRT alarms whether the target device contains one or more counterfeit electronic components.

13. A system that detects counterfeit electronic components in a target device, which is part of an electrical generation and distribution system, comprising:
    at least one processor and at least one associated memory; and
    a detection mechanism that executes on the at least one processor, wherein the detection mechanism:
        obtains target EMI signals, which were gathered by monitoring target electromagnetic interference (EMI) emissions generated by the target device using one or more target antennas positioned in proximity to the target device;
        generates a target EMI fingerprint for the target device from the target EMI signals; and
        compares the target EMI fingerprint against a reference EMI fingerprint for the target device to determine whether the target device contains one or more counterfeit electronic components.

14. The system of claim 13,
    wherein prior to obtaining the target EMI signals, the detection mechanism generates the reference EMI fingerprint; and
    wherein while generating the EMI fingerprint, the detection mechanism:
        obtains reference EMI signals generated by an optimally operating reference device of the same type as the target device based on reference EMI emissions monitored using one or more reference antennas positioned in proximity to the reference device, wherein positions of the one or more reference antennas with respect to the reference device are substantially the same as corresponding positions of the one or more target antennas with respect to the target device; and generates the reference EMI fingerprint for the reference device from the reference EMI signals.

15. The system of claim 14, wherein while generating the reference EMI fingerprint from the reference EMI signals, the detection mechanism:

performs a reference Fast Fourier Transform (FFT) operation on the reference EMI signals to transform the reference EMI signals from a time-domain representation to a frequency-domain representation;

partitions an output of the reference FFT operation into a set of frequency bins; and constructs a reference amplitude time-series signal for each of the frequency bins in the set of frequency bins.

16. The system of claim 15, wherein while generating the target EMI fingerprint from the target EMI signals, the detection mechanism:

performs a target FFT operation on the target EMI signals to transform the target EMI signals from a time-domain representation to a frequency-domain representation;

partitions an output of the target FFT operation into a set of frequency bins; and constructs a target amplitude time-series signal for each of the frequency bins in the set of frequency bins.

17. The system of claim 16, wherein while comparing the target EMI fingerprint against the reference EMI fingerprint, the detection mechanism:

trains a multivariate state estimation technique (MSET) model using the reference amplitude time-series signals for the reference EMI fingerprint, wherein the MSET model is trained prior to obtaining the target EMI signals;

uses the trained MSET model, which receives the target amplitude time-series signals as inputs, to produce estimated values for the target amplitude time-series signals;

performs pairwise differencing operations between actual values and the estimated values for the amplitude time-series signals to produce residuals;

performs a sequential probability ratio test (SPRT) on the residuals to produce SPRT alarms; and determines from the SPRT alarms whether the target device contains one or more counterfeit electronic components.

18. The method of claim 13, wherein the one or more target antennas comprise a plurality portable antennas, which are affixed at different locations and orientations with respect to the target device, and which communicate with a data-acquisition unit that gathers the target EMI signals.

* * * * *

UNITED STATES PATENT AND TRADEMARK OFFICE
CERTIFICATE OF CORRECTION

PATENT NO. : 10,685,226 B1
APPLICATION NO. : 16/292623
DATED : June 16, 2020
INVENTOR(S) : Gross et al.

It is certified that error appears in the above-identified patent and that said Letters Patent is hereby corrected as shown below:

In the Claims

Column 12, Line 24, Claim 18, delete "method" insert -- system --, therefor.

Column 12, Line 25, Claim 18, after "plurality" insert -- of --.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*